May 13, 1930.   C. A. GILLINGHAM   1,758,362
ELECTRIC BATTERY
Filed July 27, 1925
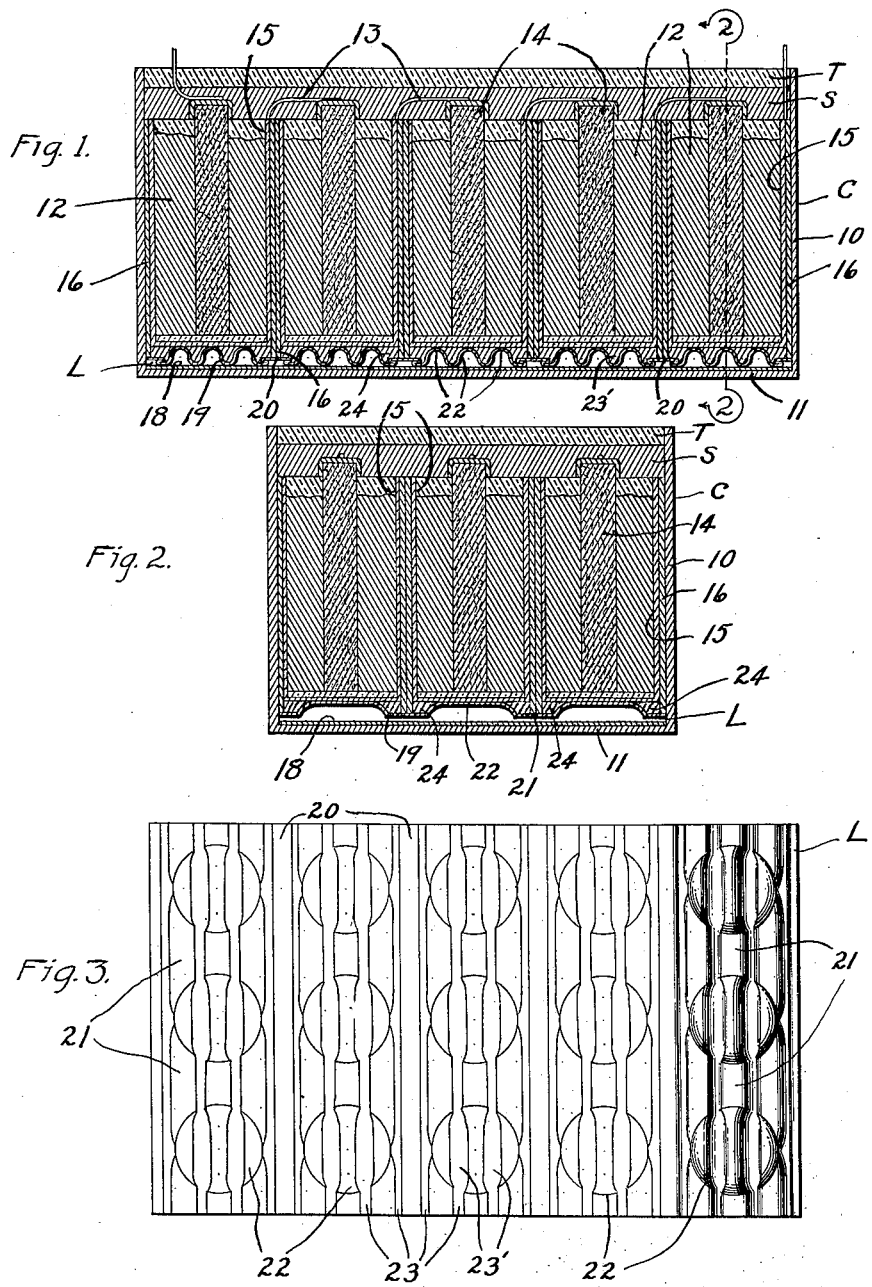

Patented May 13, 1930

1,758,362

UNITED STATES PATENT OFFICE

CHARLES A. GILLINGHAM, OF LAKEWOOD, OHIO, ASSIGNOR TO NATIONAL CARBON COMPANY, INC., A CORPORATION OF NEW YORK

ELECTRIC BATTERY

Application filed July 27, 1925. Serial No. 46,444.

This invention relates to electric batteries and more particularly to improved means for supporting the cells of a multi-cell dry battery and insulating them from one another.

Heretofore, corrugated cardboard has been used as a liner to support the cells of a battery and also to provide channels extending under the cells to receive sealing compound, as shown for example in Patent No. 1,501,084, granted July 15, 1924 to National Carbon Company, Inc. The bottom ends of the usual paper jackets or tubes which usually fit snugly around the zinc container electrodes of the cells are also supported by such liners, or by plain uncorrugated liners, on a level with the bottom ends of the zinc containers. Small pieces of metal, such as solder, sometimes drop in the spaces between the cells of the battery, during assembly or while soldering connections between the cells, and occasionally bridge the space between the adjoining edges of two cells, short circuiting them and reducing the voltage and life of the battery. Any leakage of electrolyte or other accumulation of moisture at the adjoining lower edges of the cells will also result in rapid deterioration of the battery.

One of the principal objects of this invention is to more effectively insulate the cells from one another, so that such short circuiting shall be much less likely to occur.

Another object of this invention is to provide an improved cell-supporting liner that shall leave a larger space for sealing compound beneath the bottoms of cells, especially at the peripheries of the latter.

The above and other objects and the novel features of this invention will become apparent from the following description taken in connection with the accompanying drawing, in which:

Figs. 1 and 2 are, respectively, a longitudinal sectional view and a transverse sectional view on the line 2—2 of Fig. 1, illustrating a dry battery embodying this invention; and Fig. 3 is a plan view of an improved liner or cell support embodying this invention.

Referring to the drawing, the battery case or nest C may be of cardboard, wood or other suitable material and, as shown, has a side wall 10 and a bottom wall 11. An improved liner or cell-support L constructed according to this invention is placed against and substantially covers the inside of the wall 11, which may form part of the side wall of finished batteries of some types. A plurality of dry cells 12 are desirably arranged compactly in rows upon the liner L and are electrically connected, as usual, by wires 13 soldered or otherwise united to the center carbon electrodes 14 and outer zinc container electrodes 15 of adjoining cells. Suitable insulating means may be provided to insulate the sides of the container electrodes 15 from one another. As shown, cylindrical paper tubes 16 are closely fitted to the outer cylindrical surfaces of the electrodes 15 and are of such length that they will project slightly beyond both ends of the latter when the cells are properly assembled in place.

The improved liner L is provided with raised portions or cell-supporting means at intervals on its inner face, leaving depressed areas about such cell supports. The raised portions may be formed in numerous ways to produce variously shaped means adapted to support the cells and leave sealing spaces beneath the latter. As shown, the liner L desirably consists of a layer 18 of plain cardboard or the like which has a layer 19 of corrugated cardboard or the like glued or otherwise united thereto, the two layers being impregnated, if desired, with insulating and waterproofing composition such as paraffin, asphaltum, or scale wax. By means of a suitable press, the corrugations of the layer 19 are crushed longitudinally and transversely to flatten certain corrugations 20 entirely and others partially as at 21, leaving spaced round corrugated bosses 22 upstanding to provide the desired cell-supports. Shallow channels 23 are left between the flattened corrugations, the channels between the partially flattened corrugations communicating directly with the deeper channel portions 23' between the raised portions or upstanding parts of corrugations forming the cell-supporting bosses 22.

It will be seen that the number of bosses equals the number of cells in the battery, thereby providing an individual support for each cell. The bosses are desirably of somewhat smaller area than the bottoms of the zinc cans 15 and bear against the central portion of the bottoms of the latter, leaving a sealing space 24 around or adjacent the periphery of said bottoms. The flattened corrugated portions about the bosses provide surfaces below the tops of the bosses to engage and support the lower ends of the tubes 16 which insulate the cells from one another. The bosses thus support the cells inwardly above the ends of the tubes, thereby increasing the insulating gap between the bottom ends of adjoining cells so that pieces of metal or moisture in the spaces below the plane of the tops of the bosses will not short circuit adjoining cells.

After the liner and the cells have been assembled in the case as described, suitable insulating and sealing composition S is in a heated and fluid condition is poured into the spaces between the cells and runs along the channels 23 under the lower edges of the tubes 16 into the channels 23' beneath the cells, solidifying therein and in the spaces 24 about the periphery of the bottoms of the zinc cans, further preventing short circuits by moisture or pieces of metal. Finally, a suitable plastic sealing composition T may be flowed over the tops of the cells, substantially filling the case C, thus completely sealing the cells from one another at all points.

While corrugated paperboard readily lends itself to the making of the improved liner, equivalent liners may be made by embossing or otherwise forming the desired raised cell-supporting portions on plain chipboard or strawboard sheets. Therefore, the invention is not limited to the exact details herein shown and described.

I claim:

1. In a battery, the combination of a box, a series of battery cells comprising jackets having open ends, a filling around the jackets, and a corrugated base having grooves and crowns upon which the jackest rest, the crowns having portions raised above the rest-portions to extend into the open ends of and position the jackets, the grooves between the crowns permitting the filling to pass under and into the jacket.

2. In a battery, the combination of a box, a series of battery cells comprising jackets having open ends, a filling around the jackets, and a corrugated water-proof base having grooves and crowns upon which the jackets rest, the crowns having portions raised above the rest-portions to extend into the open ends of and position the jackets, the grooves between the crowns permitting the filling to pass under and into the jacket.

3. In a battery, the combination of a box, a series of battery cells comprising jackets having open ends, a filling around the jackets, and a base composed of a corrugated water-proof sheet and a facing sheet, the corrugated sheet having grooves and crowns upon which the jackets rest, the crowns having portions raised above the rest-portions to extend into the open ends of and position the jackets, the grooves between the crowns permitting the filling to pass under and into the jacket.

4. A dry battery comprising a plurality of cylindrical dry cells, tubes surrounding and extending below said cells and insulating them from one another laterally, and a liner having bosses projecting into the tubes and against the bottoms of the cells, said bosses being channeled to receive sealing composition in the channels.

5. A liner for electric batteries comprising a sheet of corrugated paper having depressed portions extending transversely and longitudinally of the corrugations to provide spaced cell-engaging bosses on one face of said sheet, each of said bosses being of such area as to extend over a plurality of corrugations and the channels therebetween.

In testimony whereof, I affix my signature.

CHARLES A. GILLINGHAM.